US012762597B1

(12) United States Patent
Abburi et al.

(10) Patent No.: US 12,762,597 B1
(45) Date of Patent: Oct. 13, 2026

(54) SYSTEMS AND METHODS FOR USING GENETIC PROFILE DATA FOR AUTOMOTIVE AND AUTOMOTIVE INSURANCE CONTEXTS

(71) Applicant: United Services Automobile Association (USAA), San Antonio, TX (US)

(72) Inventors: Madhusudhana Rao Abburi, San Antonio, TX (US); Sean Michael Wayne Craig, San Antonio, TX (US); Stacy Callaway Huggar, San Antonio, TX (US); Roberto Virgillio Jolliffe, San Antonio, TX (US); Brian Howard Katz, San Antonio, TX (US); Carol Lyn Lawrence, Fair Oaks Ranch, TX (US); Valmore M. Smith, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 358 days.

(21) Appl. No.: 18/216,688

(22) Filed: Jun. 30, 2023

(51) Int. Cl.
*G06Q 30/0601* (2023.01)
*G06Q 30/0207* (2023.01)

(52) U.S. Cl.
CPC ..... *G06Q 30/0631* (2013.01); *G06Q 30/0224* (2013.01)

(58) Field of Classification Search
None
See application file for complete search history.

(56) References Cited

U.S. PATENT DOCUMENTS

| | | | | |
|---|---|---|---|---|
| 2008/0189047 | A1* | 8/2008 | Wong | G16B 10/00 702/20 |
| 2010/0036560 | A1* | 2/2010 | Wright | B60R 16/037 701/36 |
| 2020/0020514 | A1* | 1/2020 | Fanson | G01N 30/7206 |
| 2020/0283000 | A1* | 9/2020 | Schön | G06N 3/09 |
| 2021/0146785 | A1* | 5/2021 | Wang | G06N 20/00 |
| 2024/0249306 | A1* | 7/2024 | Scholl | G07C 5/008 |

* cited by examiner

*Primary Examiner* — Faris S Almatrahi
*Assistant Examiner* — Selena M Jin
(74) *Attorney, Agent, or Firm* — Fletcher Yoder, P.C.

(57) ABSTRACT

The embodiments described herein relate to systems and methods for using or leveraging genetic profile data (e.g., “genetic data”) for an individual as an aspect of providing recommendations (e.g., automotive purchase recommendations) for that individual. Such genetic profile data may be directly determined, such as via a gene panel or biochemical assay performed on a sample obtained for the individual in question, or indirectly determined, such as via a gene panel or biochemical assay performed on samples obtained for one or more relatives (e.g., parents, grandparents, siblings, offspring, cousins, and so forth) of the individual in question.

6 Claims, 3 Drawing Sheets

SYSTEMS AND METHODS FOR USING GENETIC PROFILE DATA FOR AUTOMOTIVE AND AUTOMOTIVE INSURANCE CONTEXTS

BACKGROUND

This section is intended to introduce the reader to various aspects of art that may be related to aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

One aspect of modern life is providing for the transportation of individuals and their families. This may provide for various tasks such as researching and selecting suitable automotive vehicles, automotive products, or automotive insurance for a given individual based on their needs and traits, as well as the needs of their family. Such tasks may also involve planning for future events, based on the probabilities of various occurrences that may be hard to quantify for a given individual. Indeed, in many cases an individual may not even know the range or types of events that might affect them (such as health related events, psychiatric events, and so forth) or, even if they are aware of certain such possible events, they may not know or understand the relative likelihoods or severities of such events in their personal context. Likewise, people differ in terms of traits or conditions that may impact what automotive vehicles, automotive products, and/or automotive insurance are appropriate for them.

With the preceding in mind, it may be appreciated that providing assistance with regard to purchasing automotive vehicles that take into account an individual's specific traits or conditions and to using such automotive vehicles may be a complex task that may be subject to much uncertainty.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a processor-implemented method is provided. In accordance with this embodiment, genetic data is received for an individual. One or more parameters utilized by a recommendation model are estimated using the genetic data. A purchase recommendation or an incentive for purchasing an automotive vehicle with at least one compensatory technology for used by the individual is generated using both the one or more parameters and the recommendation model.

In certain embodiments, a processor-implemented method is provided. In accordance with this embodiment, genetic data is received for an individual. One or more parameters utilized by an automotive configuration model are estimated using the genetic data. One or more telematics devices associated with an automotive vehicle are automatically calibrated when utilized by an individual using both the one or more parameters and the automotive configuration model. The one or more telematics devices are configured to access and to configure compensatory automotive technology associated with the automotive vehicle.

In certain embodiments, a processor-implemented method is provided. In accordance with this embodiment, genetic data is received for an individual. One or more parameters utilized by an automotive operation model are estimated using the genetic data. Sensor data of one or more sensors associated with operation of an automotive vehicle are calibrated or optimized using both the one or more parameters and the automotive operation model. The one or more sensors are configured to control or limit operation of the automotive model.

In certain embodiments, a processor-implemented method is provided. In accordance with this embodiment, genetic data or hybrid profile data including genetic data and non-genetic data is received for an individual. A review for an insurance claim is conducted utilizing at least the genetic data or the hybrid profile.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
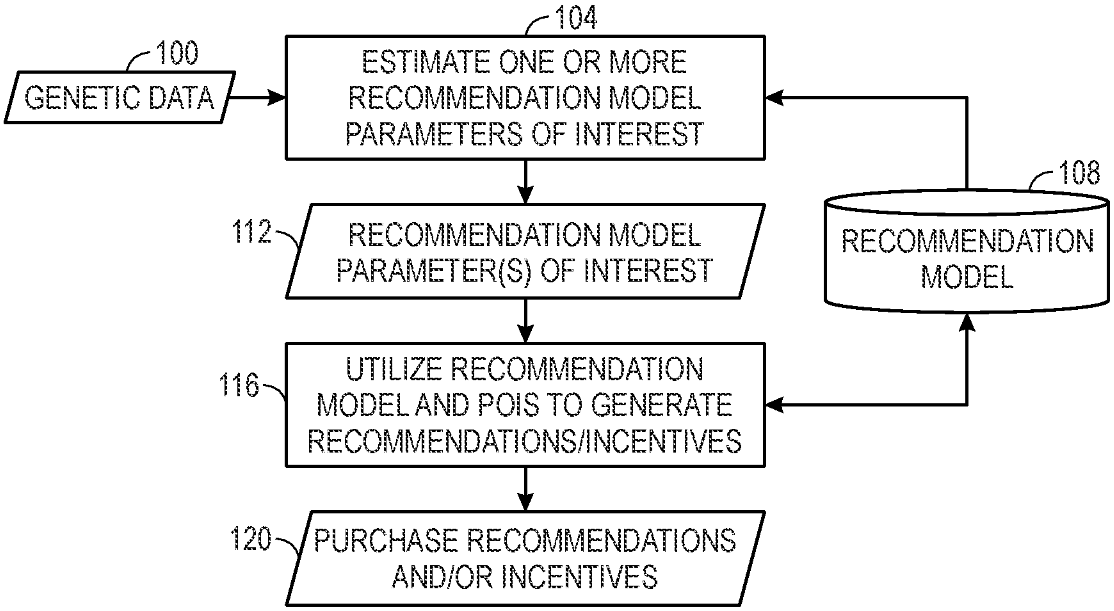
FIG. 1 depicts a process flow of steps for using genetic data to determine one or more purchase recommendations or incentives for purchasing an automotive vehicle for an individual, in accordance with aspects of the present techniques.

The present disclosure relates generally to systems and methods for utilizing genetic profile data in providing assistance with regard to purchasing automotive vehicles with compensatory or adaptive automotive technology for an individual, use of such automotive vehicles, and/or insurance of such automotive vehicles.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the terms "application", "application module" (or "module"), "engine", or "program", or "plugin" refers to one or more sets of computer software instructions (e.g., computer programs and/or scripts) executable by one or more processors of a computing system to provide particular functionality. Computer software instructions can be written in any suitable programming languages, such as C, C++, C#, Pascal, Fortran, Perl, MATLAB, SAS, SPSS, JavaScript, AJAX, and JAVA. Such computer software instructions can comprise an independent application with data input and data display aspects (e.g., modules). Alternatively, the disclosed computer software instructions can be classes that are instantiated as distributed objects. The disclosed computer software instructions can also be component software, for example JAVABEANS or ENTERPRISE JAVABEANS. Additionally, the disclosed applications or engines can be implemented in computer software, computer hardware, or a combination thereof.

As used herein, the terms "automatic" and "automatically" refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

As referred to herein, "genetic data" or "genetic profile data" refers to the allele(s) identified as present for an individual at a given gene locus. Such alleles may be consistent with what is deemed statistically normal at the respective locus (e.g., may be associated with an expected or functional gene product, such as a functional protein or enzyme). Alternatively, an allele may be deemed a variant and may be associated with a non-functional gene product or gene product that has unexpected or abnormal function (e.g., increased or decreased function). Such variants may be associated with genetic diseases or abnormalities or may simply represent a recognized change in function for the gene products of that locus. In practice, "genetic data" as used herein may be generated or otherwise derived using a genetic panel or screening technique, which may produce allele data for a set of specified or known gene loci. As used herein, "genetic data" may be derived or generated for an individual directly (e.g., by performing a screening or gene panel on a sample taken directly from the individual) or indirectly (e.g., familial genetic data derived for a respective individual based on panels or screening performed on samples taken from one or more relations, such as parents, siblings, offspring, aunts, uncles, grandparents, cousins, nephews, nieces, and so forth). For the purposes of the techniques discussed herein, directly or indirectly acquired genetic data may be used unless otherwise indicated.

As referred to herein "environmental data" refers to non-genetic and/or non-intrinsic factors associated with an individual. By way of example, environmental factors or data may relate an individual's diet and nutrition, an individual's healthcare regime or access to health and dental care (e.g., regular preventative examinations, pharmaceutical regimes, and so forth), an individual's exercise habits and regimes, whether an individual's work and/or non-work time is sedentary or active, an individual's regular or habitual drug, alcohol, or tobacco use, and so forth.

As referred to herein, "behavioral data" or "behavioral patterns" refers to actions, activities, or tendencies of an individual in terms of their actions or decisions. Such behavioral data, as used herein, may relate to, but is not limited to, driving habits or behavior. By way of example, behavioral data may relate to the types of pavements the driver drives on, the times of day the driver drives (and associated traffic density), driver's cruising pace comparted to other users of the same road at the same time of day. In general, such behavioral data may relate to, but is not limited to, an individual's decisions pertaining to driving automotive vehicles.

Further a "model" as used herein (e.g., a "recommendation model", "automotive operation model", and "claims process model" and so forth) may be understood to refer to a computationally implemented equation or representation characterizing one or more parameters of interest (POIS) in the context of other variables or parameters that may have values specified or assigned based on various data inputs used to parameterize the model. One or more of the data inputs, in the present examples, may be derived from or present in the genetic, behavioral, and/or environmental data described herein. Correspondingly, once parameterized or otherwise interacted with the respective model may provide one or more values or outputs of interest.

Aspects of the techniques discussed herein relate to using or leveraging genetic profile data (e.g., "genetic data") for an individual as an aspect of providing recommendations and/ or incentives for that individual in purchasing an automotive vehicle with compensatory or adaptive automotive technology. Aspects of the techniques discussed herein also relate to using or leveraging genetic profile data to calibrate telematics devices associated with an automotive vehicle. Aspects of the techniques discussed herein further relate to using or leveraging genetic profile data to calibrate sensor data of sensors associated with operation of an automotive vehicle. Aspects of the techniques discussed herein further relate to using or leveraging genetic profile data in an automotive claim review process. As discussed herein, such genetic profile data may be directly determined, such as via a gene panel or biochemical assay performed on a sample obtained for the individual in question, or indirectly determined, such as via a gene panel or biochemical assay performed on samples obtained for one or more relatives (e.g., parents, grandparents, siblings, offspring, cousins, and so forth) of the individual in question.

With the preceding in mind, and turning to FIG. 1, a process flow is depicted in which genetic data 100 (e.g., received or obtained genetic data of a particular individual) is used alone to select one or more automotive vehicles for an individual, to generate (block 116) one or more purchase recommendations or incentives for purchasing an automotive vehicle for the individual, or both. The automotive vehicles selected from include compensatory or adaptive automotive technology that compensate for various physical or behavioral traits or conditions that an individual has or may have. Examples of compensatory technology include assisted driving, automated headlights, heads up displays, swivel seats, high or extra-wide doors, adjustable foot pedals, large interior door handles, oversized knobs with clearly visible labels, support handles to assist with entry or exit, large or adjustable-size print for dashboard gauges, seat adjusters that can move the seat in all directions, dashboard-mounted ignition, and so forth. In this example, directly or indirectly determined genetic data 100 for an individual is used as an input to a process (e.g., a processor- or computer-implemented process) that estimates (block 104) one or more parameters 112 (parameters of interest (POIS)) of a recommendation model 108. In this example, the recommendation model 108 may describe or characterize automotive vehicles with at least one suitable compensatory technology or incentive (e.g., automotive insurance rate discounts) for purchasing such automotive vehicles (as indicated by reference numeral 120) suitable for a population or sub-population of individuals and may make selections or recommendations of such automotive vehicles or incentives 120 for a given individual based on characteristics of the individual. By way of example, the genetic data may be utilized to identify one or more physical or behavioral traits or conditions for which compensatory technologies exist to derive the one or more parameters utilized by the recommendation model 108. Also, a life expectancy, present or potential disease state, general or specific health condition, biochemical markers, and so forth may be derived directly or indirectly from the genetic data 100 and may be used to define or parameterize one or more of the values or variables used by the recommendation model 108 to generate recommendations or selections of automotive vehicles and/or incentives for purchasing such automotive vehicles (as indicated by reference numeral 120) that may then be displayed via a graphical user interface or otherwise displayed or presented to an individual.

One benefit of the approach illustrated in FIG. 1 is that it may allow useful selections or recommendations of automotive vehicles with compensatory technology and/or incentives to be provided to an individual at a younger age. In particular, useful data related to lifespan, potential medical conditions or diseases, and so forth may be determined at an earlier stage in life based on the underlying genetic profile without waiting for phenotypic manifestations of an underlying or potential state or condition.

Figure 2:
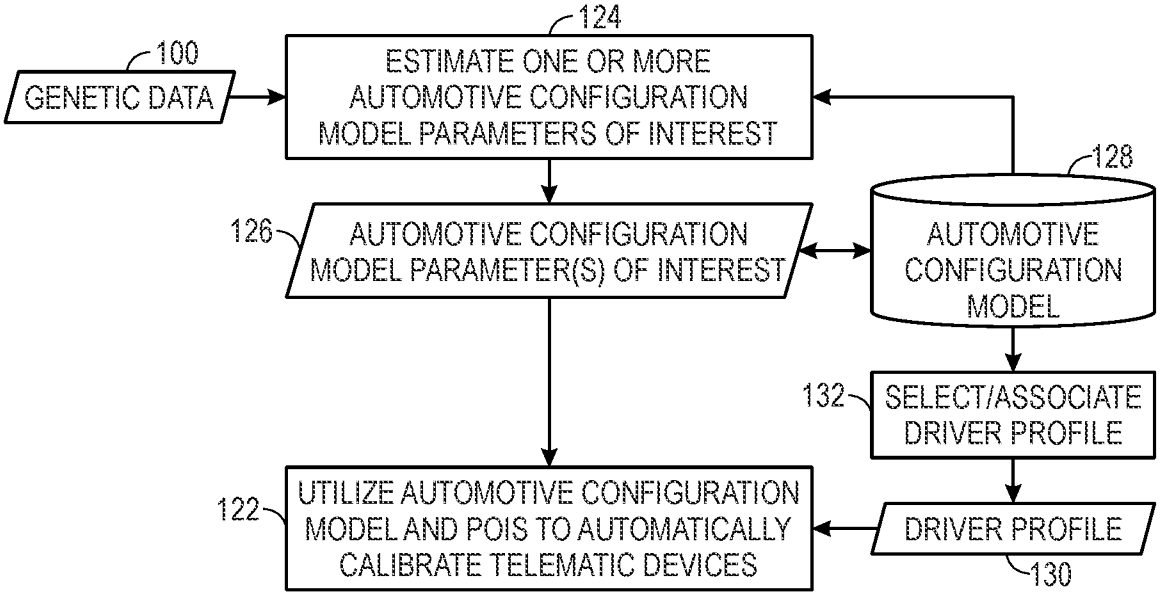
FIG. 2 depicts a process flow of steps for using genetic data to automatically calibrate telematics devices associated with an automotive vehicle driven by an individual, in accordance with aspects of the present techniques.

Turning to FIG. 2, in a further aspect, genetic data 100 (e.g., received or obtained genetic data of a particular individual) is used alone to automatically calibrate or set a baseline (block 122) for one or more telematics devices associated with an automotive vehicle when utilized by an individual (i.e., driver). The one or more telematics devices are configured to access and to configure compensatory or adaptive automotive technology associated with the automotive vehicle based on the driver. Such telematics devices may be part of automotive vehicle to be driven and/or worn by a driver (e.g., glasses, smart watches, etc.) of the automotive vehicle. Such telematics devices include OBD II telematics systems, Bluetooth-powered telematics systems, smartphone-based telematics systems, black box telematics systems, OEM hard-wired telematics systems, 12V plug-in self-installation telematics systems, and so forth. In this example, directly or indirectly determined genetic data 100 for an individual is used as an input to a process (e.g., a processor- or computer-implemented process) that estimates (block 124) one or more parameters 126 (parameters of interest (POIS)) of an automotive configuration model 128. In this example, the automotive configuration model 128 may describe or characterize different driver profiles (each associated with configuring compensatory automotive technology) suitable for different sub-populations of individuals and may select a driver profile 130 for a given individual based on characteristics of the individual (block 132). By way of example, the genetic data 100 may be utilized to identify one or more physical or behavioral traits or conditions to derive the one or more parameters 126 utilized by the automotive configuration model 128. Also, a life expectancy, present or potential disease state, general or specific health condition, biochemical markers, and so forth may be derived directly or indirectly from the genetic data 100 and may be used to define or parameterize one or more of the values or variables used by the automotive configuration model 128 to associate the respective data of an individual with a respective drive profile (e.g., utilized in configuring the compensatory automotive technology) that may be communicated to one or more telematics devices associated with the automotive vehicle to be driven by the individual.

Figure 3:
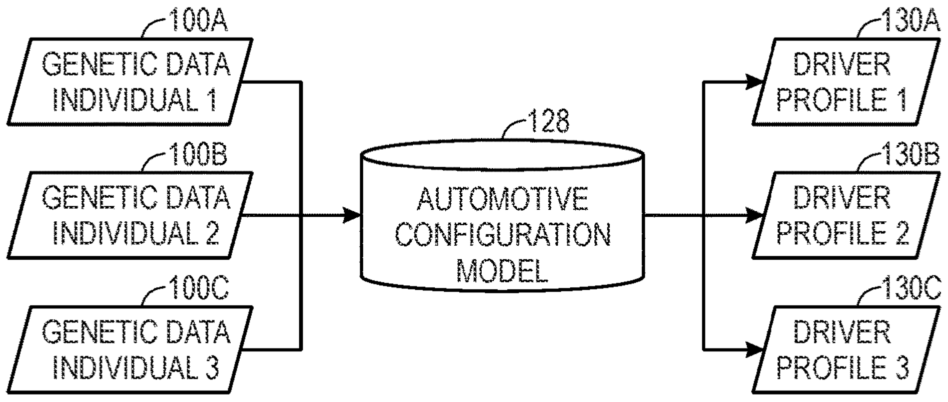
FIG. 3 depicts a process flow of steps using genetic data from different individual to determine different driver profiles (e.g., for configuring compensatory automotive technology), in accordance with aspects of the present techniques.

In certain embodiments, multiple individuals may drive the same vehicle. As depicted in FIG. 3, different individuals' genetic data (100A, 100B, and 100C) (e.g., received or obtained genetic data of the different individuals) are provided as input to be utilized by the automotive configuration model 128. The automotive configuration model 128 associates a respective driver profile (130A, 130B, and 130C) with each individual. The respective driver profile of the individual driving the vehicle may be provided to the one or more telematics devices associated with the one or more telematics devices and utilized in configuring the compensatory automotive technology of the automotive vehicle.

Figure 4:
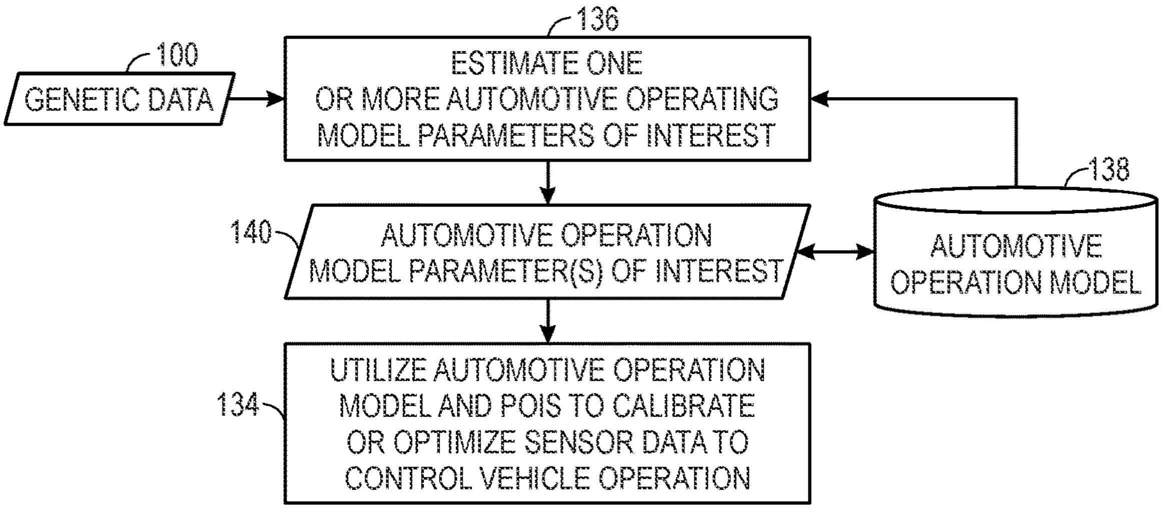
FIG. 4 depicts a process flow of steps for using genetic data to automatically calibrate sensor data of sensors associated with controlling operation of an automotive vehicle driven by an individual, in accordance with aspects of the present techniques.

Turning to FIG. 4, in a further aspect, genetic data 100 (e.g., received or obtained genetic data of a particular individual) is used alone to automatically calibrate or optimize sensor data (block 134) of one or more sensors associated with operation of an automotive vehicle when utilized by an individual (i.e., driver). The one or more sensors are configured to control or limit operation of the automotive vehicle. Such sensors may be part of the automotive vehicle to be driven and/or worn by a driver of the automotive vehicle. Such sensors may control driver assistance technologies or other aspects of the automotive vehicle. Such driver assistance technologies may relate to collision warning (e.g., forward collision warning, lane departure warning, rear cross traffic warning, blind spot warning, etc.), collision intervention (e.g., automatic emergency braking, pedestrian automatic emergency braking, rear automatic braking, blind spot intervention, etc.), driving control assistance (e.g., adaptive cruise control, lane centering assistance, lane keeping assistance, etc.), and/or other systems (e.g., automatic high beams, backup camera, automatic crash notification, etc.). Such sensors may monitor characteristics (e.g., physical characteristics of the drivers as presence of prescribed medication in individual's body, line of sight of the individual driver, physiological parameters of the individual driver (e.g., respiration rate, pulse, blood pressure, etc.). In certain embodiments, the sensors may take a biological sample (e.g., blood, sweat, or breath) of the driver. In certain embodiments, one or more of the sensors may be configured to prevent the automotive vehicle from being driven based on feedback (i.e., sensor data) received from the sensors (in light of calibration or optimization).

In this example, directly or indirectly determined genetic data 100 for an individual is used as an input to a process (e.g., a processor- or computer-implemented process) that estimates (block 136) one or more parameters 126 of an automotive operation model 138. In this example, the automotive operation model 138 may describe or characterize different calibrations or optimized values for sensor data for one or more sensors that control automotive vehicle operation that are suitable for different sub-populations of individuals and may utilize particular calibrations or optimized values for sensor data for a given individual based on characteristics of the individual. By way of example, the genetic data 100 may be utilized to identify one or more physical or behavioral traits or conditions to derive the one or more parameters 140 (parameters of interest (POIS)) utilized by the automotive operation model 138. Also, a life expectancy, present or potential disease state, general or specific health condition, biochemical markers, and so forth may be derived directly or indirectly from the genetic data 100 and may be used to define or parameterize one or more of the values or variables used by the automotive operation model 138 to calibrate or optimize sensor data of one or more sensors associated with an automotive vehicle driven by the individual.

Figure 5:
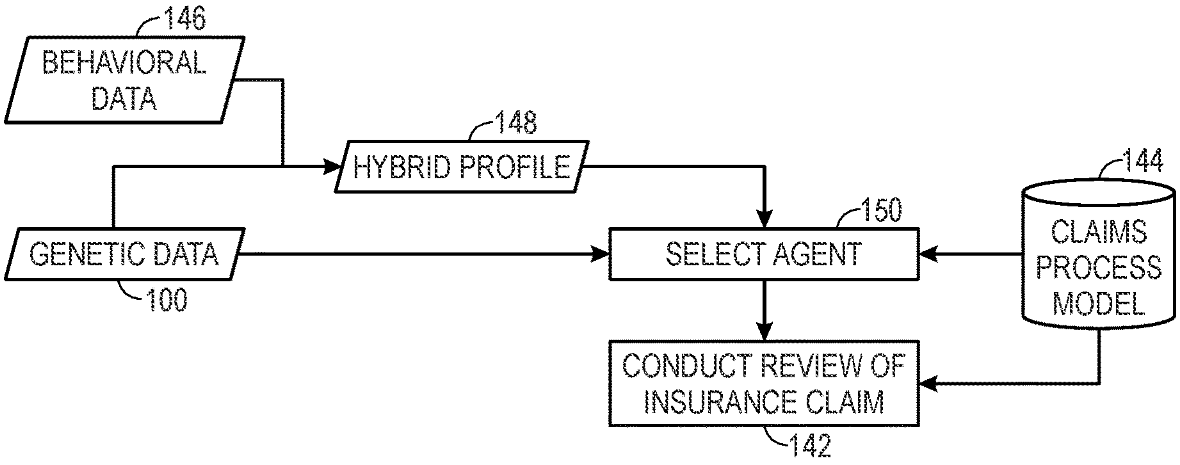
FIG. 5 depicts a process flow of steps for using genetic data to process an insurance claim review, in accordance with aspects of the present techniques.

Turning to FIG. 5, in a further aspect, genetic data 100 (e.g., received or obtained genetic data of a particular individual) may, alone or in combination with other data, be used to process (e.g., conduct) (block 142) a review of an insurance claim (e.g., automotive insurance claim) for an individual. By way of example, the genetic data 100 may be utilized to identify one or more physical or behavioral traits or conditions relevant to the insurance claim. Also, a life expectancy, present or potential disease state, general or specific health condition, biochemical markers, and so forth may be derived directly or indirectly from the genetic data 100 and may be used to define or parameterize one or more of the values or variables used by a claims process model 144 to process the insurance claim.

As discussed herein, the genetic data 100 may be used solely in processing the claim or may be used in combination with other data (e.g., behavioral data 146 received or obtained of the particular individual) to generate a hybrid data profile 148 that is instead or additionally used to process (e.g., conduct) (block 142) a review of an insurance claim. By way of example, such behavioral data 146 may include behavioral factors and other non-genetic factors of interest. The behavioral data 146 may relate to driving habits. By way of example, behavioral data may relate to the types of pavements the driver drives on, the times of day the driver drives (and associated traffic density), driver's cruising pace compared to other users of the same road at the same time of day. In general, such behavioral data 146 may relate to, but is not limited to, an individual's decisions pertaining to driving automotive vehicles. In such scenarios, the hybrid profile 128 may include both the genetic and behavioral data as separate and discrete variables and/or may include computed variables derived from both genetic and behavioral factors that capture confounding or interaction effects. In practice, such a hybrid profile 128, if employed, may be useful in capturing complex or interaction data that may be useful in conducting the claim review.

In certain embodiments, the claims process model 144 may be utilized in combination with the genetic data 100 and/or the hybrid profile 148 in selecting (block 150) an agent from a plurality of agents for handling the review of the insurance claim. In certain embodiments, a particular agent may have more experience in handling claims with individuals having certain conditions or traits (e.g., those traits that require compensatory or adaptive automotive technology). In certain embodiments, a particular agent may have more experience handling claims with vehicles that employ compensatory or adaptive automotive technology.

In certain embodiments, the claims process model 144 may be utilized in combination with the genetic data 100 and/or the hybrid profile 148 in directly conducting certain aspects of the review of the insurance claim (block 142). For example, the claims process model 144 may select or recommend a particular appraiser that specializes or has more experience in appraising vehicles having compensatory or adaptive automotive technology. In another example, the claims process model 144 may select or recommend an automotive shop that has more experience in working on vehicles having compensatory or adaptive automotive technology.

Figure 6:
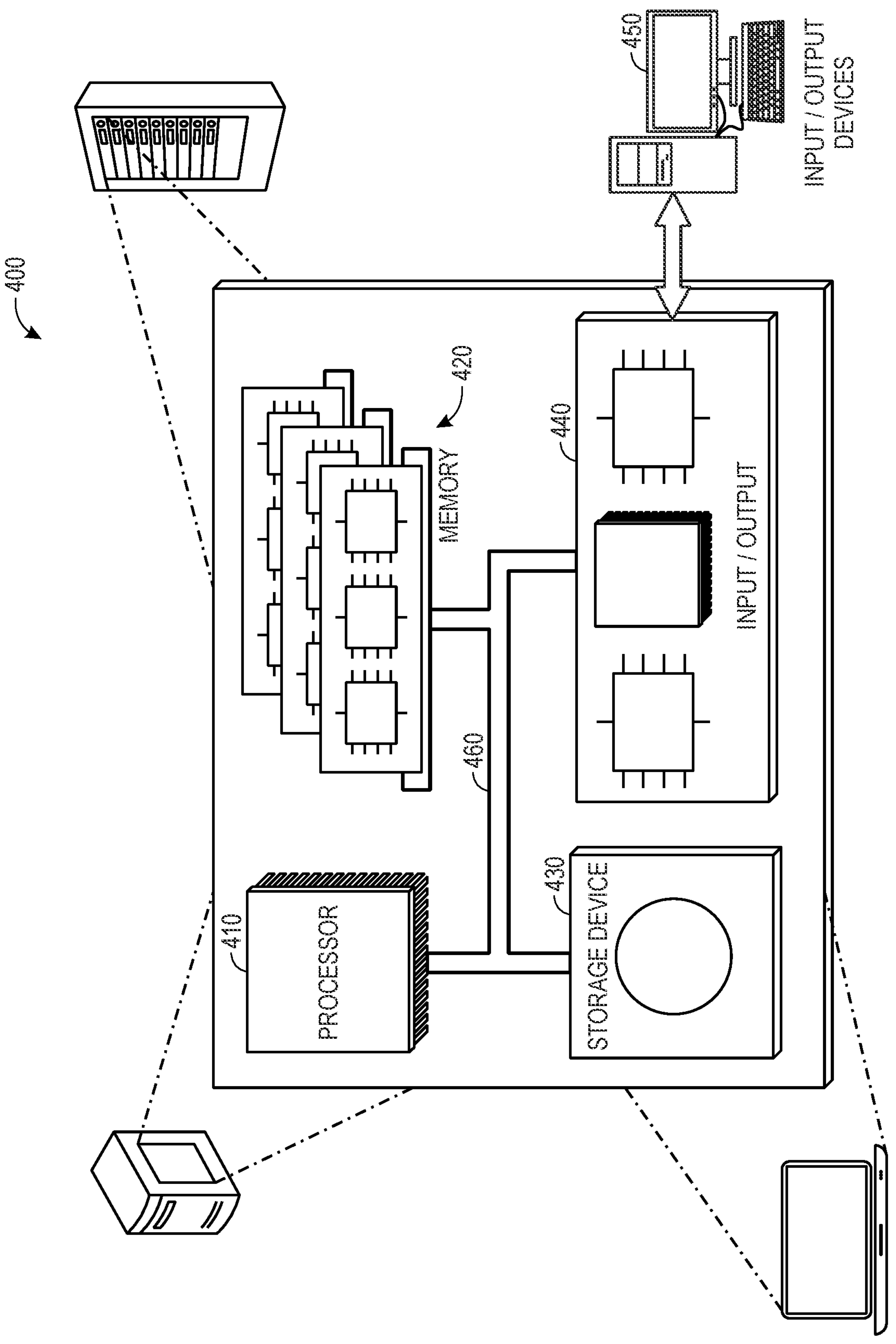
FIG. 6 illustrates aspects of an example computing system, in accordance with embodiments described herein.

With the preceding in mind, FIG. 6 illustrates an example computing system 400 that the embodiments or techniques described herein may use to perform their respective operations. The system 400 may be used for any of the operations described with respect to the various embodiments described herein. For example, the system 400 may be included, at least in part, in one or more of the computing device(s) and/or other computing device(s) or system(s) described herein that may be configured to: generate, send, receive, obtain, update, or process genetic data or other data (e.g., behavioral or environmental data); generate, utilize, update, or communicate with a genetic or hybrid profile; implement or access a financial model, risk model evaluation model, risk factor model, and so forth); or otherwise implement one or more of the processes described herein. In certain embodiments, the system 400 may include one or more processors 410, one or more memory 420, one or more storage devices 430, and one or more input/output (I/O) devices 450 controllable via one or more I/O interfaces 440. The one or more processors 410 may include a processor system 410, which may include a single processor or multiple processors operating together or separately. Likewise, the one or more memory 420 may include a memory system 420, which may include a single memory or multiple memories operating together or separately. The various components 410, 420, 430, 440, or 450 may be interconnected via at least one system bus 460, which may enable the transfer of data between the various modules and components of the system 400.

In certain embodiments, the processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. For example, the processor(s) 410 may execute instructions for various software module(s) performing steps or actions as described herein. The processor(s) 410 may include hardware-based processor(s) each including one or more cores. The processor(s) 410 may include general purpose processor(s), special purpose processor(s), or both.

In certain embodiments, the memory 420 may store information or executable code within the system 400. In certain embodiments, the memory 420 includes one or more computer-readable media. The memory 420 may include any number of volatile memory units, any number of non-volatile memory units, or both volatile and non-volatile memory units. The memory 420 may include read-only memory, random access memory, or both. In certain embodiments, the memory 420 may be employed as active or physical memory by one or more executing software modules.

In certain embodiments, the storage device(s) 430 may be configured to provide (e.g., persistent) mass storage for the system 400. In certain embodiments, the storage device(s) 430 may include one or more computer-readable media. For example, the storage device(s) 430 may include a floppy disk device, a hard disk device, a solid-state drive, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a solid-state storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In certain embodiments, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 410 and the memory 420 may be supplemented by, or incorporated into, one or more application-specific integrated circuits (ASICs).

In certain embodiments, the system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400 or may be external on one or more computing devices of the system 400.

In certain embodiments, the system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-832 standard for serial ports, or with a version of the IEEE AA884 standard for parallel ports. As another example, the I/O interface(s) 440 may be configured to provide a connection over Universal Serial Bus (USB) or Ethernet. In certain embodiments, the I/O interface(s) 440 may be configured to provide a serial connection that is compliant with a version of the IEEE AA994 standard.

In certain embodiments, the I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more communication networks using any network protocol.

Computing devices of the system 400 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors (e.g., processors 410) executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random-access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 400 that includes a back-end component, e.g., as a data server, or that includes a middleware component, e.g., an application server, or that includes a front-end component, e.g., a client computer having a graphical user interface or a web browser through which a user may interact with the system 400, or any appropriate combination of one or more such back-end, middleware, or front-end components. The components of the system 400 may be interconnected by any appropriate form or medium of digital data communication, e.g., a communication network. Examples of communication networks include a local area network ("LAN") and a wide area network ("WAN"), e.g., the Internet.

In certain embodiments, the computing system 400 may include clients and servers. A client and server are generally remote from each other and typically interact through a communication network. The relationship of client and server arises by computer programs running on the respective computers and having a client-server relationship to each other.

While this disclosure contains many specifics, these should not be construed as limitations on the scope of the disclosure or of what may be claimed, but rather as descriptions of features specific to particular embodiments. Certain features that are described in this disclosure in the context of separate embodiments may also be implemented in combination in a single embodiment. Conversely, various features that are described in the context of a single embodiment may also be implemented in multiple embodiments separately or in any suitable sub-combination. Moreover, although features may be described herein as acting in certain combinations and even initially claimed as such, one or more features from a claimed combination may in certain embodiments be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain embodiments, multitasking and parallel processing may be advantageous. Moreover, the separation of various system components in the embodiments described herein should not be understood as requiring such separation in all embodiments, and it should be understood that the described program components and systems may generally be integrated together in a single software product or packaged into multiple software products.

A number of embodiments have been described herein. Nevertheless, it will be understood that various modifications may be made without departing from the spirit and scope of the disclosure. For example, various forms of the flows described herein may be used, with steps re-ordered, added, or removed. Accordingly, other embodiments are within the scope of the following claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A processor-implemented method, comprising:

receiving, at a processing system, genetic data for an individual;

estimating, at the processing system, one or more parameters utilized by an automotive configuration model using only the genetic data;

utilizing, at the processing system, the automotive configuration model to associate the genetic data of the individual with a driver profile based the one or more parameters that were estimated;

automatically, at the processing system, calibrating one or more telematics devices associated with an automotive vehicle when utilized by the individual using both the one or more parameters that were estimated and the driver profile determined by the automotive configuration model, wherein the one or more telematics devices are part of the automotive vehicle and/or worn by a driver of the automotive vehicle, and calibration of the one or more telematics devices sets baselines specific to the individual for configuring compensatory automotive technology associated with the automotive vehicle; and utilizing, at the processing system, the one or more telematics devices that have been calibrated to access and to configure the compensatory automotive technology associated with the automotive vehicle based on the driver profile when the individual utilizes the automotive vehicle, wherein configuring the compensatory automotive technology comprises adjusting a component of the automotive vehicle to compensate for one or more physical traits, behavioral traits, or conditions of the individual.

2. The processor-implemented method of claim 1, comprising:

receiving respective genetic data for each individual of a plurality of individuals having access to the automotive vehicle;

estimating respective one or more parameters utilized by the automotive configuration model for each individual using the respective genetic data for each individual;

automatically calibrating the one or more telematics devices associated with the automotive vehicle when utilized by a respective individual of the plurality of individuals using both the respective one or more parameters for the respective individual and the automotive configuration model; and utilizing the automotive configuration model to associate the respective genetic data of each individual with a respective driver profile to be utilized in configuring the compensatory automotive technology associated with the automotive vehicle when the respective individual utilizes the automotive vehicle.

3. The processor-implemented method of claim 1, wherein the genetic data is derived from the individual directly.

4. The processor-implemented method of claim 1, wherein the genetic data is derived for the individual using other genetic data acquired from one or more relatives of the individual.

5. The processor-implemented method of claim 1, wherein the one or more telematics devices comprise onboard diagnostics telematic systems, Bluetooth-powered telematics systems, smartphone-based telematics systems, black box telematics systems, OEM hard-wired telematics systems, or 12V plug-in self-installation telematics systems.

6. The processor-implemented method of claim 1, wherein compensatory automotive technology comprises assisted driving, automated headlights, swivel seats, high or extra-wide doors, adjustable foot pedals, large interior door handles, oversized knobs with clearly visible labels, support handles to assist with entry or exit, large or adjustable-size print for dashboard gauges, or seat adjusters that can move the seat in all directions.

* * * * *